United States Patent
Backus

(10) Patent No.: US 11,330,093 B2
(45) Date of Patent: May 10, 2022

(54) MAGNETICALLY CONNECTABLE GRIP AND CONNECTOR FOR ELECTRONICS

(71) Applicant: ohSnap, Inc., Aex, NC (US)

(72) Inventor: Dale Backus, Apex, NC (US)

(73) Assignee: ohSnap, Inc., Apex, NC (US)

( * ) Notice: Subject to any disclaimer, the term of this patent is extended or adjusted under 35 U.S.C. 154(b) by 0 days.

(21) Appl. No.: 17/349,139

(22) Filed: Jun. 16, 2021

(65) Prior Publication Data

US 2021/0314430 A1    Oct. 7, 2021

Related U.S. Application Data

(63) Continuation of application No. PCT/US2021/035514, filed on Jun. 2, 2021.

(60) Provisional application No. 63/033,408, filed on Jun. 2, 2020.

(51) Int. Cl.
*H04M 1/00* (2006.01)
*H04M 1/02* (2006.01)

(52) U.S. Cl.
CPC ................ *H04M 1/0281* (2013.01)

(58) Field of Classification Search
CPC ............. H04M 1/0202; H04M 1/0208; H04M 1/0254; H04M 1/0281; H04M 1/185
See application file for complete search history.

(56) References Cited

U.S. PATENT DOCUMENTS

| | | | |
|---|---|---|---|
| 9,800,283 B2 | 10/2017 | Schmidt | |
| 2007/0206275 A1* | 9/2007 | Hemmer | G02B 21/0024 359/385 |
| 2015/0380139 A1 | 12/2015 | Hsu | |
| 2017/0318697 A1 | 11/2017 | Lebovitz | |
| 2017/0338676 A1 | 11/2017 | Yan | |
| 2020/0237310 A1* | 7/2020 | Lozano-Buhl | A61B 90/36 |

OTHER PUBLICATIONS

"Oh Snap Grip: How Smart People Use Smartphones", Backus, May 16, 2020, 6 pages.
International Search Report and Written Opinion for International Application PCT/US2021/35514 dated Jun. 2, 2021, 11 pages.

* cited by examiner

*Primary Examiner* — Tuan Pham
(74) *Attorney, Agent, or Firm* — David A. Jones; Nadesan Beck P.C.

(57) ABSTRACT

Finger grip and connector for portable electronics, in particular cell phones. The grip includes a metallic ring. The ring adheres to the back of a cell phone, or case. The grip includes a corresponding ring of magnets for a grip assembly to magnetically attach to the metal ring adhered to the cell phone. The grip design provides infinite rotation of the grip assembly relative to the phone for holding the phone in various positions. The grip provides a support for viewing content on the electronic device at different angles and orientations. The grip provides a means of magnetically attaching a cell phone to metallic surfaces, chargers, mounts, and other devices. The grip can allow for wireless charging, which is optimized and enabled by a relatively large open inner diameter of the metallic ring and corresponding magnets. The grip can retract to be less than 3 millimeters in total thickness.

24 Claims, 19 Drawing Sheets

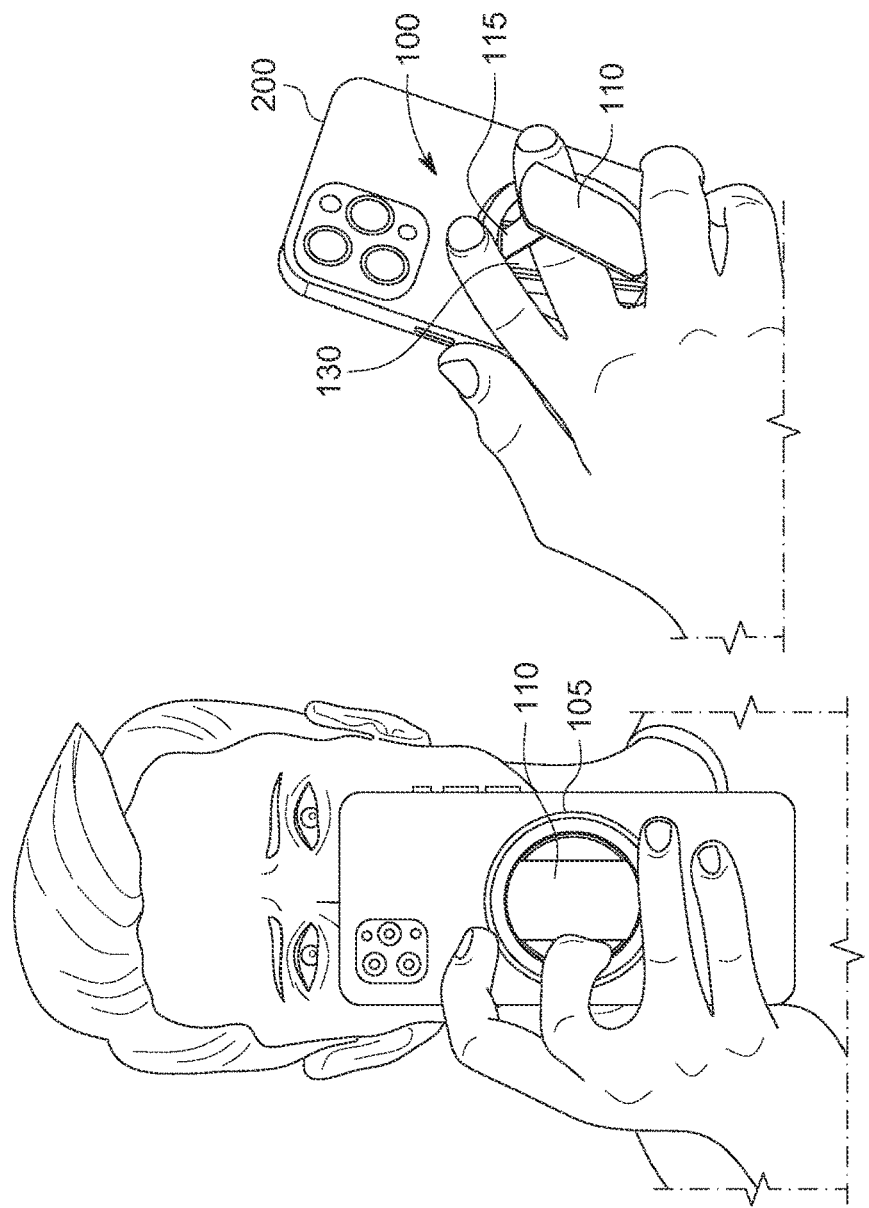
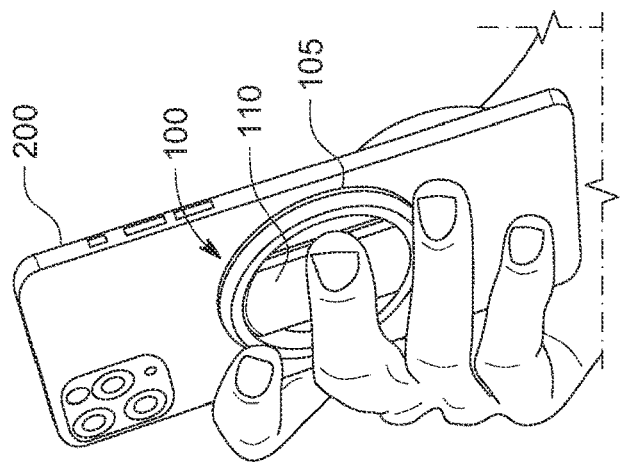
FIG. 4

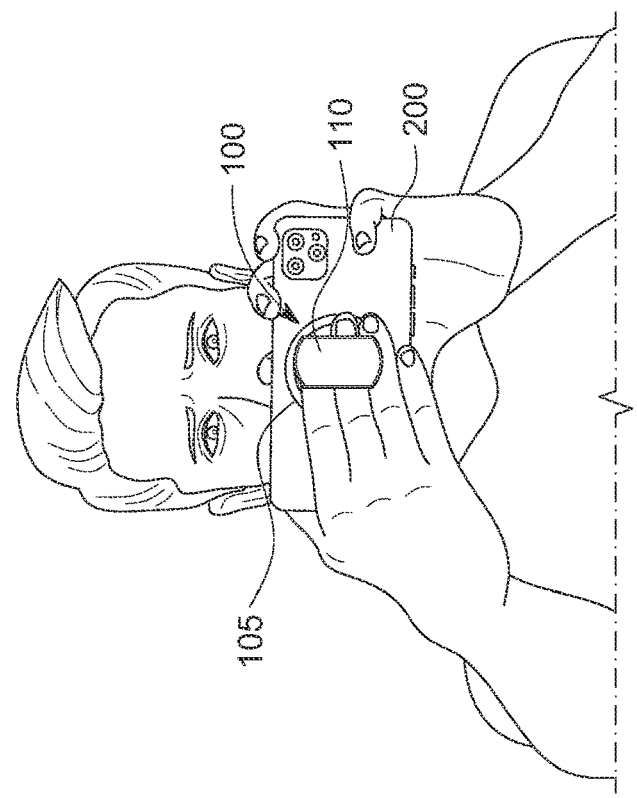
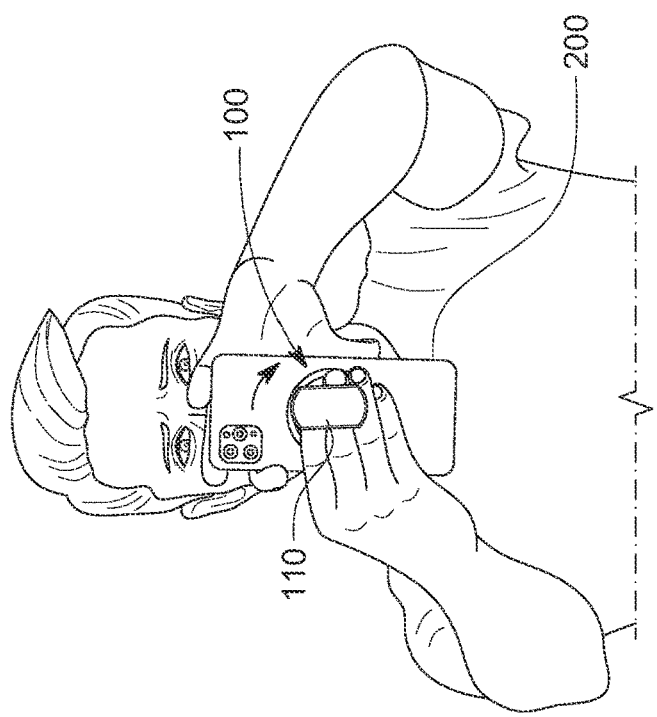
FIG. 5

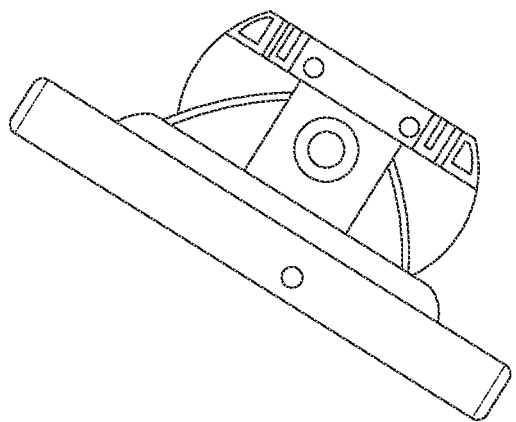
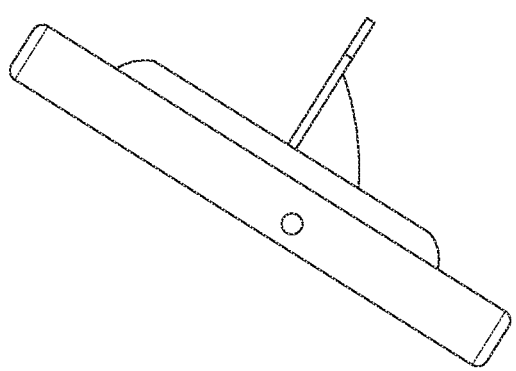
FIG. 6

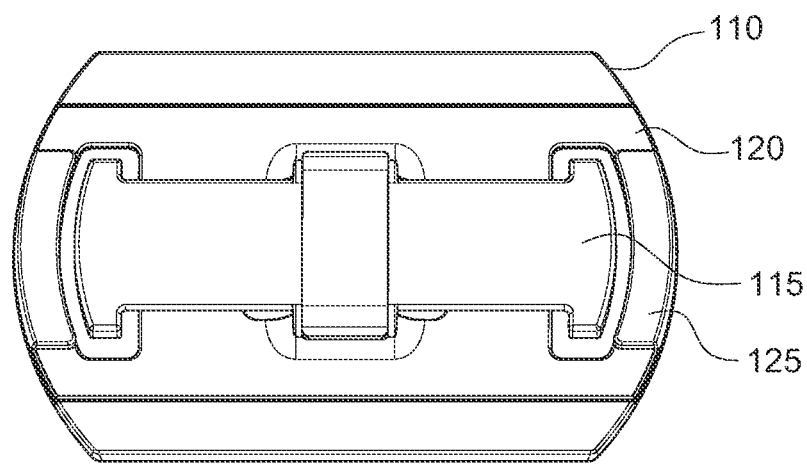
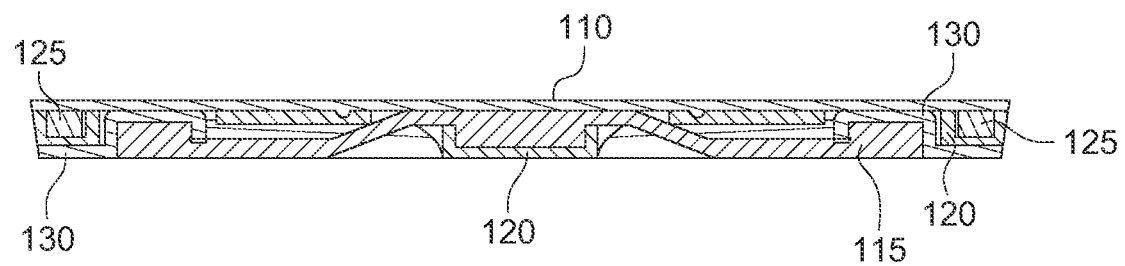
FIG. 12

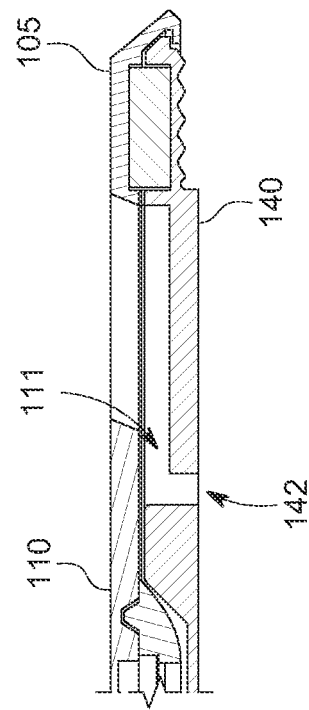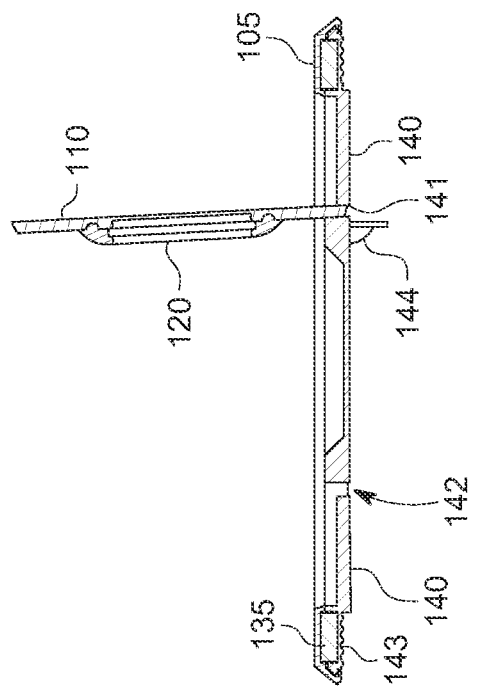

MAGNETICALLY CONNECTABLE GRIP AND CONNECTOR FOR ELECTRONICS

CROSS-REFERENCE TO RELATED APPLICATIONS

This application is a continuation of International Application PCT/US2021/35514, with an international filing date of Jun. 2, 2021, which claims priority to and the benefit of U.S. Provisional Application No. 63/033,408, filed Jun. 2, 2020, the contents of both applications are incorporated herein by reference in their entirety and for all purposes.

BACKGROUND OF THE INVENTION

Smartphones have become seemingly ubiquitous in modern society. A smartphone is a portable device that combines mobile telephone and computing functions into one unit. They are distinguished from feature phones by their stronger hardware capabilities and extensive mobile operating systems, which facilitate wider software, internet (including web browsing over mobile broadband), and multimedia functionality (including music, video, cameras, and gaming), alongside core phone functions such as voice calls and text messaging. Smart phones generally have a touch screen interface, camera, speaker, microphone, some power and volume buttons and traditionally a charging/data port.

In recent years, these devices have increased in size, leaving users with smaller hands unable to adequately grasp their smartphone during use. Even users with larger hand sizes may struggle to safely hold their smartphone while using the total functional area of the smartphone's touchscreen interface. To solve this problem, accessory makers have provided attachable grips, which attach to the back of the phone and allow the user to easily grasp their smartphone.

In the current arts, finger holders are provided in various configurations, including ring grips, elastic grips, pop-up grips, and the like, with each configuration having its own unique benefits and drawbacks. Most finger grips only have the single function of aiding the user in retaining a suitable grip to reduce the likelihood of dropping their smartphone. Many finger holders are unable to function as a smartphone stand, which may be used to hold upright or at an angle the smartphone on a surface such as a tabletop.

Wireless charging, including Qi wireless power transfer standards, has become increasingly popular in recent years, especially for smartphone charging. These devices utilize an alternating current charging base station that can be powered by a household power supply. The charging base station may include a transmitter coil, which can generate a magnetic field that induces a receiver coil inside of a smartphone and is known as magnetic resonance charging. However, wireless charging systems in the current arts are unable to be used with conventional finger holders.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

The invention disclosed herein is directed to finger grip. The finger grip includes a circular array of magnets that correspond to a circular steel ring adhered to the back of a cell phone. The finger grip further includes a finger grip assembly for holding the grip using one or more fingers. The finger grip assembly includes a frame supporting one or more magnets for magnetically coupling the finger grip assembly to the circular metallic ring. The finger grip further includes a cap and a flexible band coupling the cap to the frame and allowing for insertion of a finger between the cap and frame. The finger grip includes circular double-sided adhesive substrate adhered to a side of the circular metallic ring and conforming to a shape of the circular metallic ring.

The one or more magnets include a circular array of magnets arranged around a periphery of the frame. The outer periphery of the frame substantially conforms to an outer diameter of the circular metallic ring. The one or more magnets can include a plurality of arc-shaped magnets disposed in a circular peripheral channel of the frame. The finger grip includes a trim element having a circular peripheral cavity for retaining the arc-shaped magnets when connected to the frame.

The finger grip further includes a frame retainer configured to retain opposing ends of the band against the frame. The finger grip includes a cap retainer, the cap retainer configured to retain a middle portion of the band against the cap. The cap retainer being connected to the cap, and can be laser welded to the cap to securely retain the portion of the band between the cap retainer and the cap.

The frame retainer can have a mechanical connector for mechanically connecting the frame retainer to the frame. The frame retainer being disconnectable from the frame to replace the frame retainer, band, cap retainer, and cap.

The cap and cap retainer can encapsulate cap magnets. The cap magnets are coupled to the cap and align the cap with the one or more magnets supported by the frame. The one or more magnets supported by the frame can conform in size and shape to the steel ring adhered to the back of a cell phone. The finger grip assembly is configured to spin indefinitely relative to the circular magnetic ring when magnetically the finger grip assembly is coupled to the circular magnetic ring.

The frame can include a slot for receiving and supporting a side of the cap to provide a support structure for viewing a cell phone at an angle to a surface. The finger grip assembly is rotatable about the circular metallic ring such that the cap is configured to provide a support structure for the cell phone in different orientations and different angles. Preferably, the frame includes two symmetrical slots for receiving opposing sides of the cap to provide the support structure, the band biasing the cap into the slot when the cap is inserted each of the two symmetrical slots.

In some illustrative embodiments, the one or more magnets can provide between 3 and 3.9 pounds of force to couple the finger grip to an external metallic object, for example. According to this preferred example, the one or more magnets can provide about 4 pounds of force to couple the finger grip assembly to the circular metallic ring. Thus, the force provided to couple the grip to the metallic object is less than the force provided to couple the grip assembly to the circular metallic ring such that the grip is pulled off objects by pulling on the cell phone rather than the grip assembly being pulled off of the metallic ring.

The one or more magnets can include an array of multi-polarity arch magnets, wherein an outer ring of the magnets have positive polarity and an inner ring of the magnets have negative polarity. In such embodiment, the multi polarity arrangement of magnets enhances magnetic strengths and focuses the magnetic fields which reduces magnetic interference for improved wireless charging.

In some advantageous embodiments the metallic ring is a steel ring having an outer diameter of about 57 millimeters, an inner diameter of about 45.8 millimeters and a thickness of about 0.4 millimeters. Preferably, the ring is relatively large and the inner diameter is likewise large to allow for improved charging. According to certain advantageous embodiments, the size and shape conform of the metal ring and corresponding arc magnets conform to the APPLE MAGSAFE specification. In a collapsed position, the finger grip can be less than 5 millimeters thick, preferably about 3 millimeters thick.

A circular metallic ring for attachment to a cell phone or cell phone case is disclosed. The circular metallic ring is made of a ferrous material for connection to magnetic objects and devices. The circular metallic ring can have an outer diameter of about 56-58 millimeters and an inner diameter of about 45-46 millimeters. The circular metallic ring includes an adhesive, such as a thin double sided adhesive tape, for attaching the circular metallic ring to a cell phone or cell phone case. The circular metallic ring can preferably have an outer diameter of about 57 millimeters and an inner diameter of about 45.8 millimeters. The adhesive of the circular metallic ring can include a double-sided adhesive substrate adhered on one side to the circular metallic ring. The double-sided adhesive substrate can be circular and have the same inner and outer diameter as the circular metallic ring. A cell phone or cell phone case can have the metallic ring attached thereto for connection of the cell phone or cell phone case to a magnetic apparatus or device. The circular metallic ring can be substantially large and span most of the width of the back side of the smart phone with a relatively large portion of the back of the cell phone or cell phone cover exposed due to the large interior diameter of the relatively thin circular metallic ring. Advantageously, this large interior diameter allows access for charging a cellular phone.

Additional features, uses, manufacturing methods, and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates use of the finger grip by placement of a finger between a cap of the finger grip; and a base assembly of the finger grip;

FIG. 5 illustrates rotation of the finger grip assembly about a metallic ring adhered to the cell phone;

FIG. 6 illustrates top views of the clip being used as a stand in landscape and upright top elevational views;

FIG. 12 shows an assembly of a cap, band, and cap retainer as well as a cross-sectional view thereof;

FIG. 17A is a cross-sectional view of the frame with the cap in a standing position illustrating a draft angle of an insertion slot;

FIG. 17B illustrates a gap between the cap and the frame for enabling finger access;

DETAILED DESCRIPTION

Figure 1:
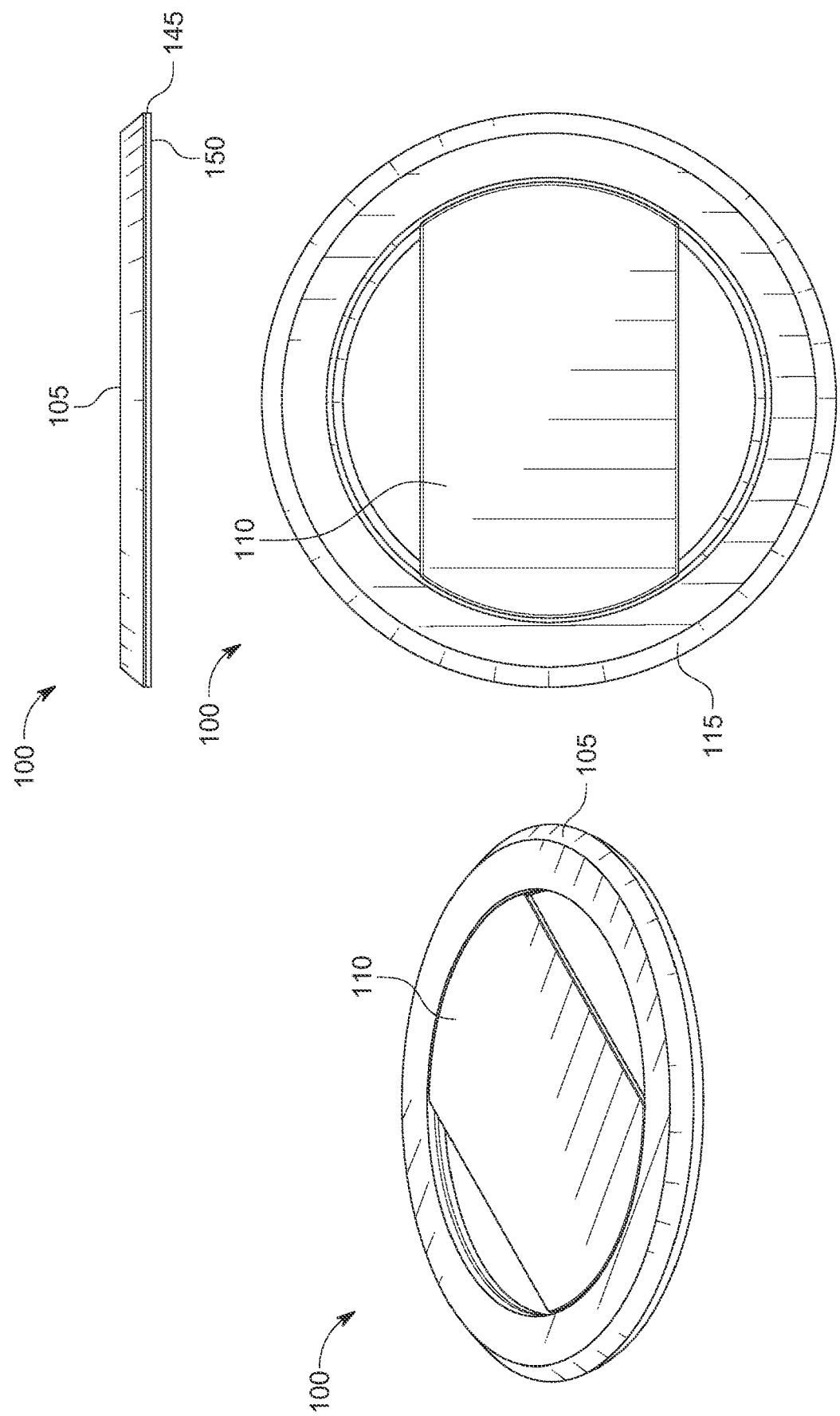
FIG. 1 illustrates a front, side and perspective view of a finger grip according to an embodiment of the invention.
Figure 2:
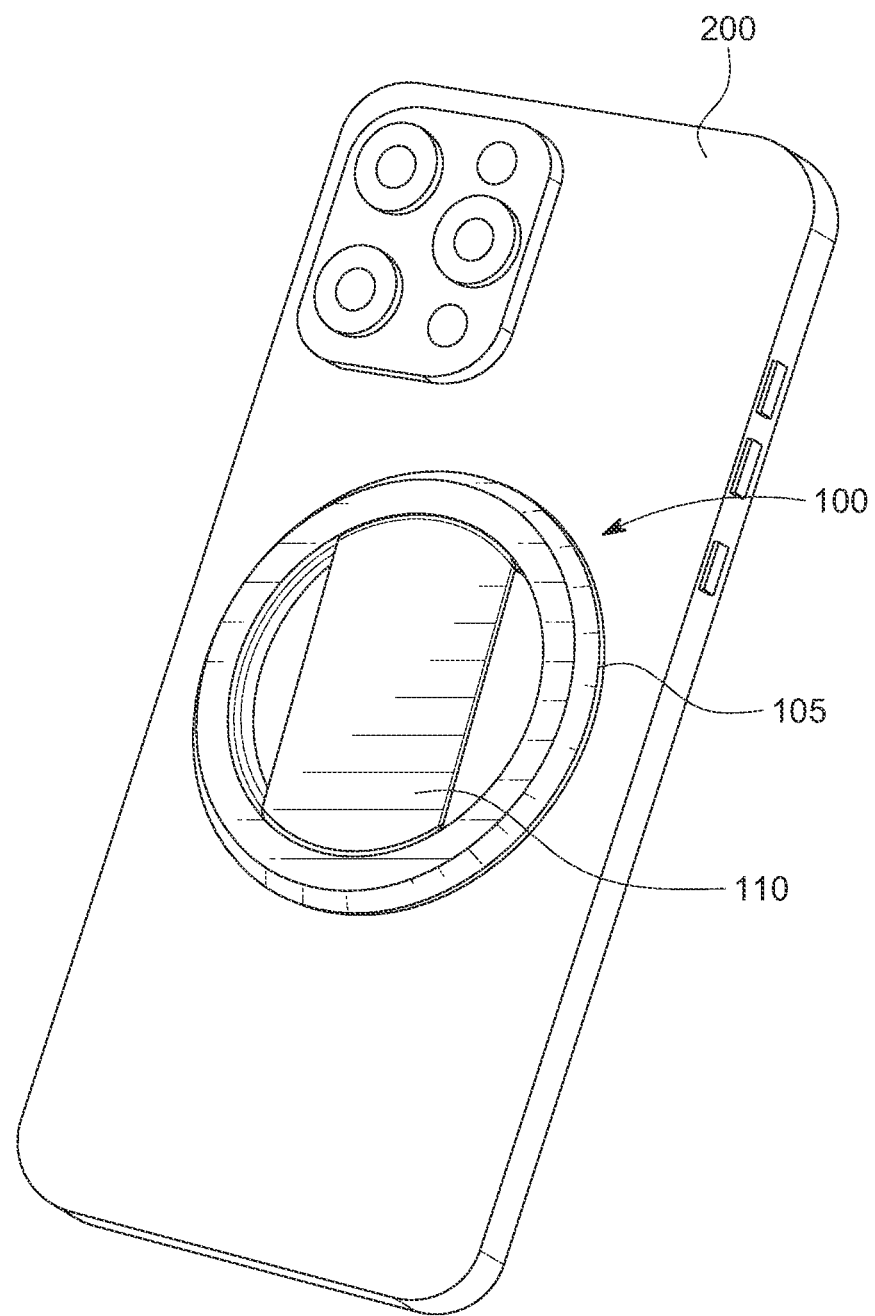
FIG. 2 illustrates the finger grip adhered to a back side of a cell phone.

Embodiments of the invention disclosed herein relate to a finger grip for portable electronics, in particular a finger grip for cell phones. Referring to FIG. 1, a grip 100 is illustrated according to an example embodiment of the invention. The grip 100 includes a ferromagnetic steel, nickel plated ring 145 with double sided adhesive 150 on one side of the ring. The ring is adhered to the back of a cell phone 200 as shown in FIG. 2 or a case of a cell phone and provides the means for a grip assembly 105 to magnetically attach to the ring 145.

Figure 3:
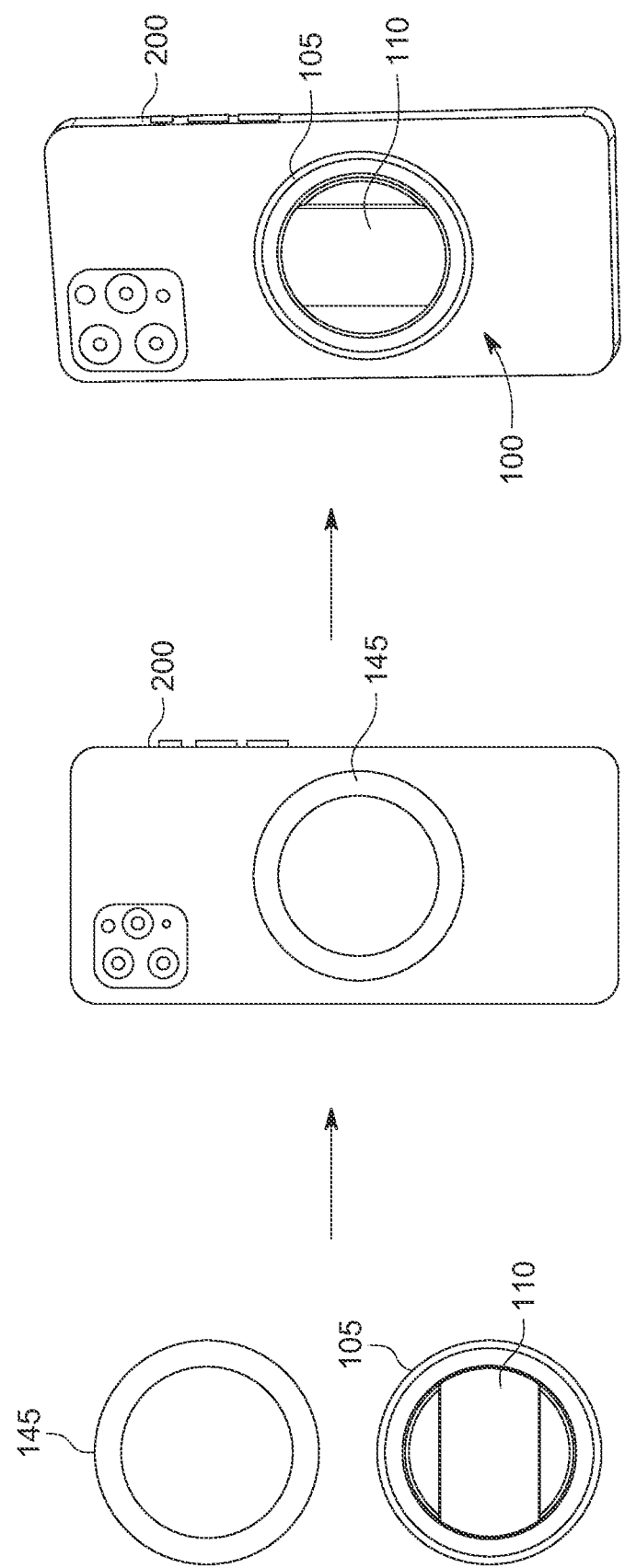
FIG. 3 illustrates application of the finger grip to the back of a cell phone.

The finger grip 100 is comfortable and a quickly deployable finger grip 100. FIG. 3 illustrates the simplicity of installation of the deployable finger grip 100 on a cell phone 200. The finger grip 100 is provided in two parts, which may be assembled and shipped in a package, but separable by hand as shown on the left. Next, an adhesive covering is removed from a side of the metallic ring 145 and the metallic ring is adhered to the rear of the cell phone 200 as shown. Then, the finger grip assembly including the clip 110 magnetically snaps onto the ring 145 and the assembly of the grip 100 with the phone is complete and usable as shown in FIG. 4. The grip 100 can include infinite rotation for holding the phone 200 in various positions as shown in FIG. 5.

Figure 7:
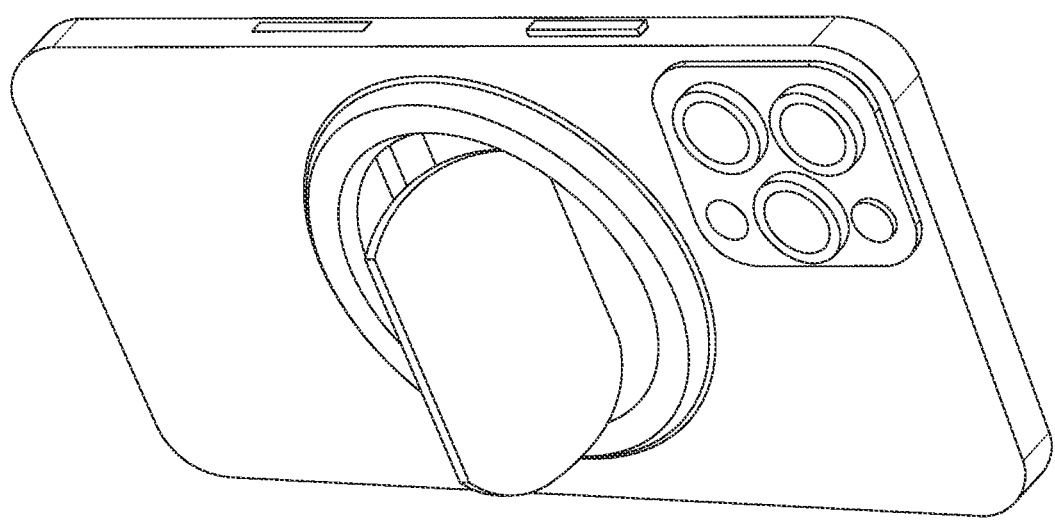
FIG. 7 illustrates the clip being used as a stand in a front perspective view in a landscape orientation of the cell phone.

The grip can provide an easy-to-use deployable support, or "kickstand," as shown in FIGS. 6 and 7 for viewing content on the electronic device at different angles and orientations.

Figure 8:
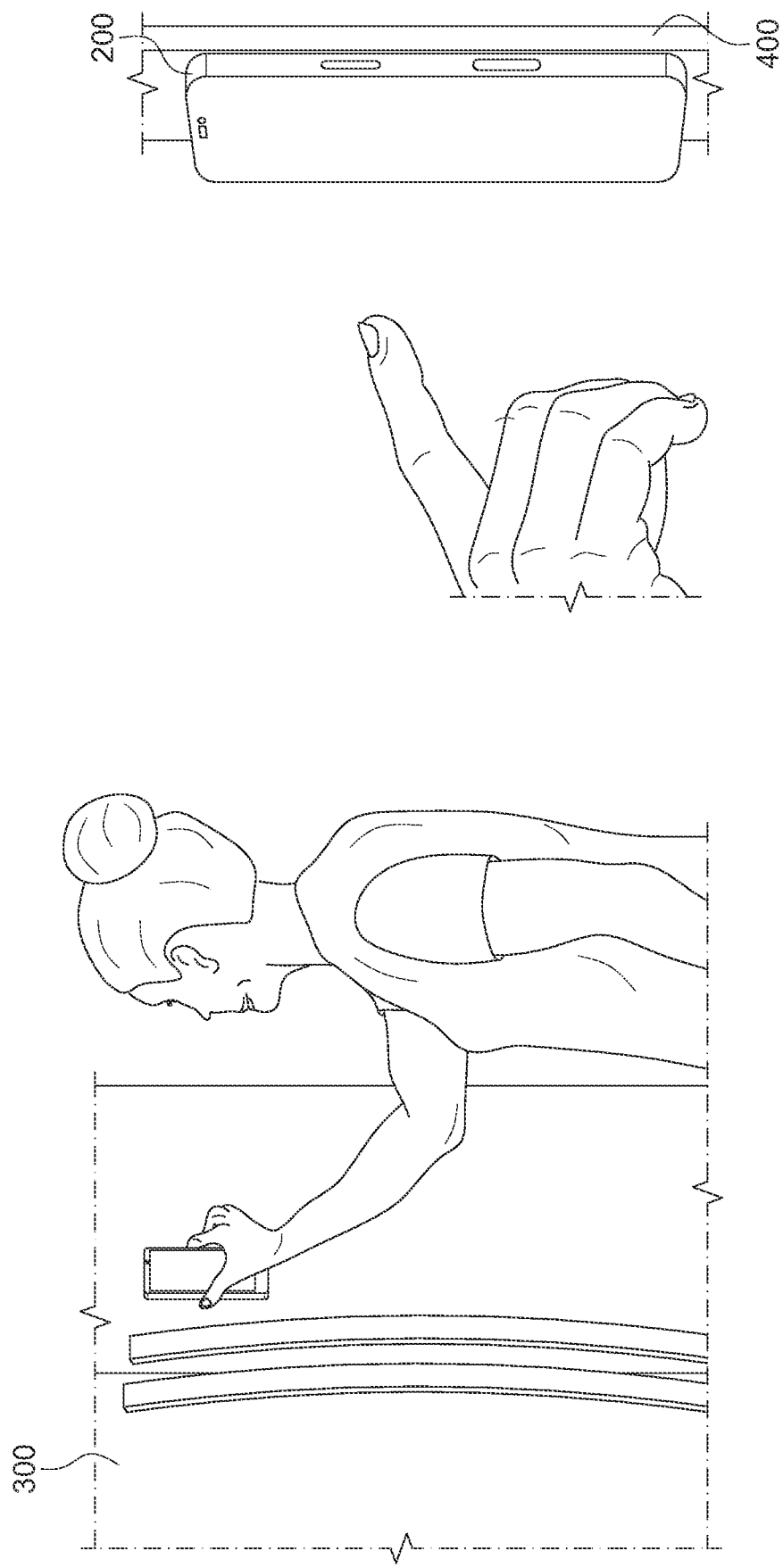
FIG. 8 illustrates the magnetic finger grip in a closed position being used to attach or mount the cell phone to a refrigerator and metallic surface.

The grip 100 provides a means of magnetically attaching and positioning a cell phone, for example, to metallic surfaces, chargers, mounts, and other peripheral devices as shown in FIG. 8.

Figure 9:
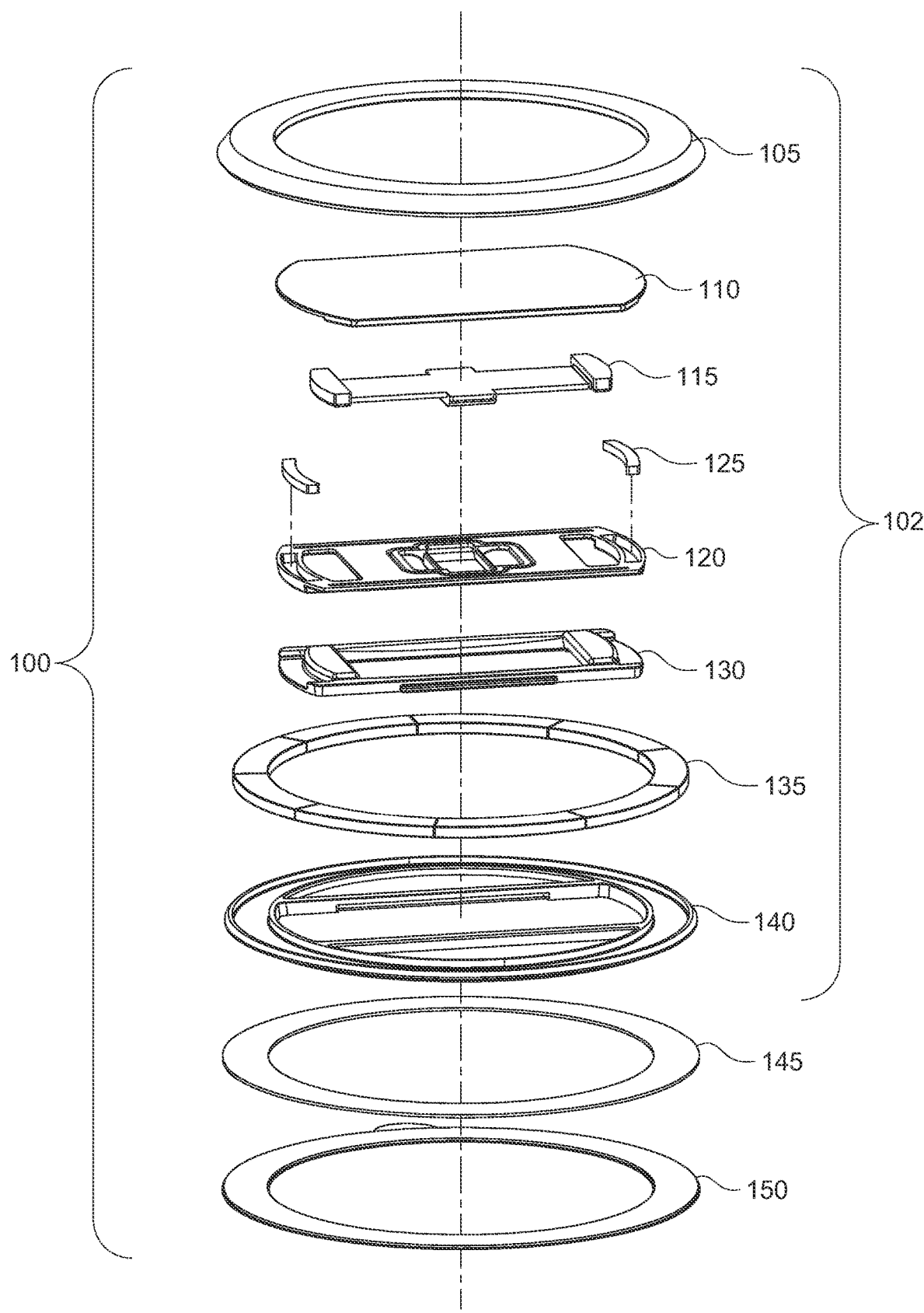
FIG. 9 illustrates an exploded view showing the parts of the finger grip.

The grip 100 can allow for wireless charging, which is optimized by a relatively large open inner diameter of attachment metallic ring 145 and corresponding magnets 135 as shown in FIG. 9. In preferred embodiments, the grip can retract to be less than 3 millimeters in total thickness. This reduced thickness is important for overall desirability, but also particularly important for wireless charging as disclosed herein.

Embodiments of the grip 100 can be quickly detachable from a cell phone, for example using only a few pounds of force. Yet, the force is sufficient to adhere the cell phone to a metallic object as mentioned and optimized as discussed herein.

Figure 23:
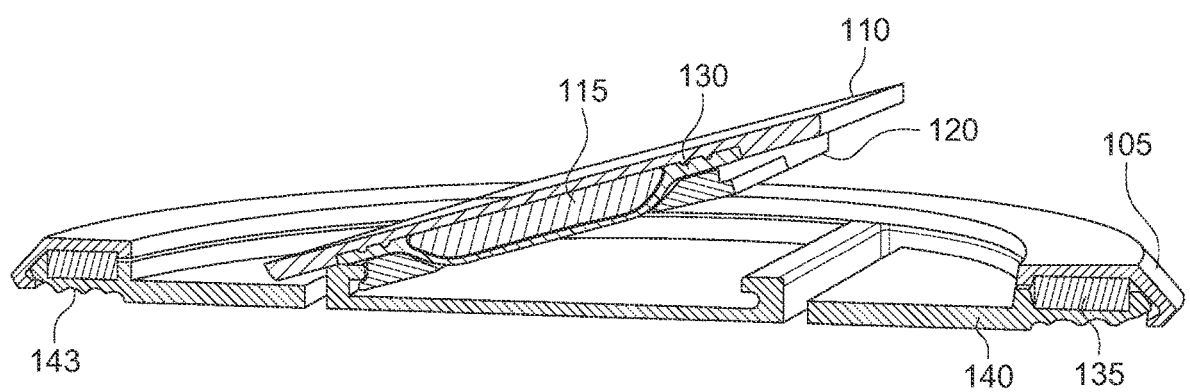

According to some preferable embodiments, the grip 100 can have user replaceable parts that might wear over time. For example, referring to FIGS. 9, 12, and 23 a cap 110 and retainer 120 and 130 assembly including a silicone band 115 which is a less expensive can be replaceable in some embodiments as disclosed herein. The grip 100 can be simple enough in design that allows a top surface to have graphics printed thereon. Assembly of the grip 100 with the cell phone 200, or other portable electronic device for example, can be extremely easy to accomplish in only a single step of adhering an adhesive 150 lined metallic ring 145 to the cell phone or cell phone case as previously discussed with reference to FIG. 3. And, the grip 100 disclosed herein can be used with any common cell phone brand, whether the cell phone 200 is used with a case or not.

The grip 100 includes the circular steel ring 145 and the array of magnets 135, which can be quad-polar arc magnets and correspond to the APPLE MAGSAFE magnetic standard. Inside the ring of magnets 135 is the finger grip mechanism of the grip 100 that provides both the finger grip and the stand for using the smart phone 200 in a comfortable and secure manner.

Figure 11:
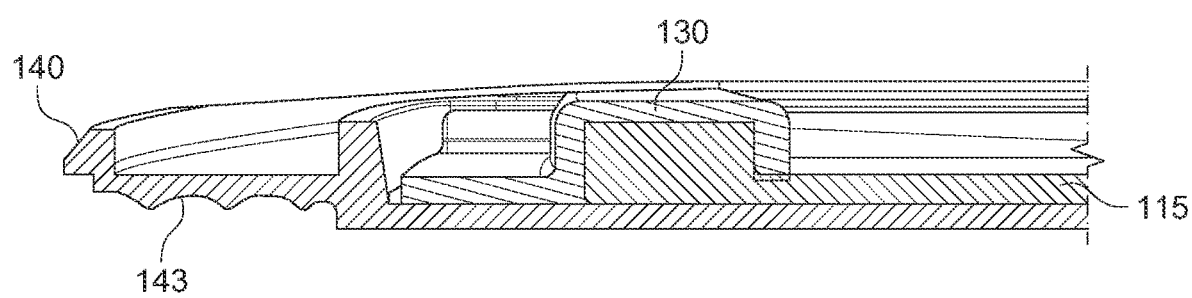
Figure 19:
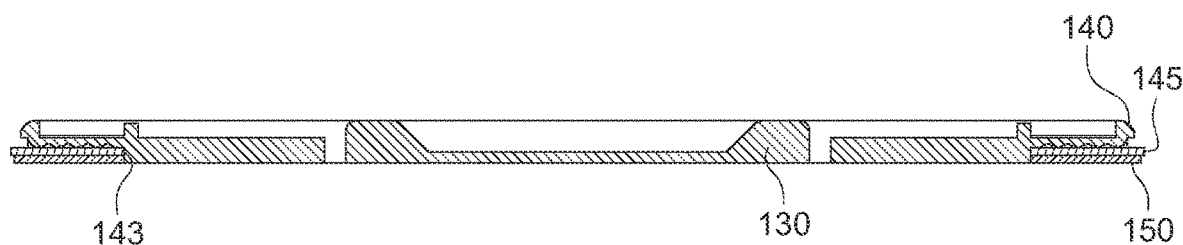
FIG. 19 illustrates a location boss of the frame that mates with an inner diameter of the metallic ring.

The frame 140 of the grip 100 has a small circular boss 143 as shown in FIG. 11 on the bottom and in FIG. 19 that corresponds to the inner aperture of the steel ring 150 which provides X-Y lateral locking, while allowing the grip 100 to spin/rotate within the ring infinitely.

The steel ring 150 preferably has the largest possible opening/aperture D1 (see FIG. 18) in the middle. For example, in some embodiments, the inner diameter D1 can be more than 30 millimeters, or in one preferred embodiment about 40-50 millimeters, 45-45 millimeters, or according to one preferred embodiment the inner diameter is 45.8 mm. The grip preferably does not have any steel objects inside of this inner diameter D1 area, because it's key functionality for the grip 100 to allow fast wireless charging with or without the main grip assembly (everything but the metal ring) attached to the phone 200. Wireless charging can occur with both the grip 100 attached to the adhered ring 145 and with the ring 145 alone.

The bottom surface of the plastic grip frame 140 portion preferably has specialized groove features as discussed and shown in FIG. 11 that minimize the contact surface area between the grip 100 and the steel ring 145 adhered to the cell phone 200 or case. This is important because of the magnetic forces involved with the grip 100, phone 200, and charger (not shown).

Preferably, the plastic grip portion 102 including the magnets 135 rotates relative to the adhered 150 ring 145 with relative ease, but also the grip 100 resists detachment from the ring 145. The manual pulling force required to release the grip 100 from the ring 145 should be in excess, and preferably no less than 4 pounds of force. With that requirement, if the grip 100 or steel ring 145 contact surface were completely flat, it would create too much drag and friction for rotation. Therefore, preferably the contact surfaces include grooves 143 that reduce the amount of drag and friction between the plastic grip portion 102 and the steel ring 145 by several orders of magnitude.

In preferred embodiments, the plastic grip portion 102 attaches to the steel ring 145 with enough magnetic attraction that it takes at least 4 lbs of force to release the grip portion 102 from the ring 145. The magnets 135 also serve another purpose, which is to allow the user to magnetically attach their smartphone 200 to ferrous metal and magnetic surfaces, such as refrigerators, gym equipment, car, chargers, desk mounts, etc. as shown in FIG. 8. According to certain preferred embodiments, the magnets 135 are powerful enough on the side opposite to the steel ring 135 to suspend a smartphone on a flat magnetic steel surface of varying smoothness, but also not detach from the ring 145 when the user attempts to pull the smartphone 200 off this surface. This is accomplished by using a specific grade and thickness of magnet 135.

In preferred embodiments discovered by the inventor of this patent application, N52 grade neodymium magnets 135 with multi-pole technology that are about, or exactly, 1.4 millimeters in thickness have been discovered as an example of a suitable range and thickness. For example, it has then been discovered and designed by the inventor to control the wall thicknesses of the trim 105 above the magnets and frame 140 below the magnets to make sure the magnet requirements are satisfied as shown in FIG. 16.

Figure 16:
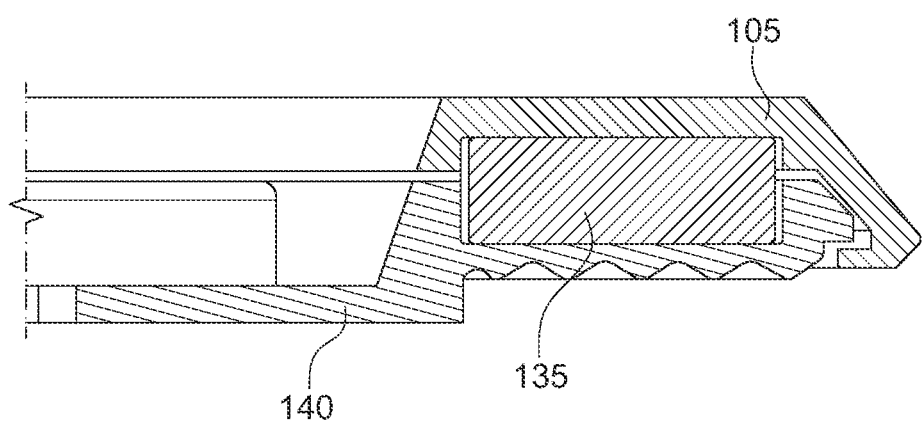
FIG. 16 illustrates a cutout view of the primary magnets with the cap magnet.

In FIG. 16, the trim 105 is the very top plastic circular ring part that encapsulates the magnets 135 from the top. A plastic version of the trim 105 can be ultrasonic welded to the frame 140. For a metal embodiment, the trim can be snapped into place via an undercut groove around the perimeter of the trim 105 as shown in FIG. 16.

More specifically, according to one example embodiment, 4 lbs of pull force is required to remove the plastic and magnet portion 102 from the steel ring 145. Comparatively, 3-3.9 lbs force is suitable on the other side of the grip 100 (mounting a cell phone 200 to steel objects). And, with this related thickness of the surrounding trim 105 and frame 140 elements, this 3-3.9 lbs force is enough to Inside the diameter of the metallic ring 145 is where the grip and stand functionality reside. Referring again to FIG. 9, the components of the grip 100 include the cap 110, a flexible band 115, a cap retainer 120, cap alignment magnets 125, a base frame 140, frame retainer 130, frame magnets 135, and trim 105.

As shown in FIG. 12, the cap 110 and cap retainer 120 encapsulate the middle of the band 115 using a thick section of silicone to maximize surface contact area and prevent the cap 110 from translating or rotating independently from the band 115. It is especially important for the cap 110 to not be able to rotate independently of the band 115. The silicone is what keeps the cap sitting flush when the finger is removed, so if the cap 110 can rotate about the band 115, this can cause the cap 110 to not retract fully and get "hung up" on the trim 105 and not end up flush with the top of the grip 100, which is undesirable.

To help prevent this problem, the inventor has discovered that it is not optimal to rely entirely on the silicone band 115 to hold the cap 110 in place. Compression molded silicone has low memory and is good at dimensional recovery. However, if the band 115 is stretched to an extreme or gets heavily used, it is possible for the band 115 to stretch to a point where it's no longer effective at holding the cap 110 in place. Moreover, a worn band will cause a "jiggly cap" or cap sag when held upside down, which contributes to a low feeling of quality and general poor user experience.

Figure 13:
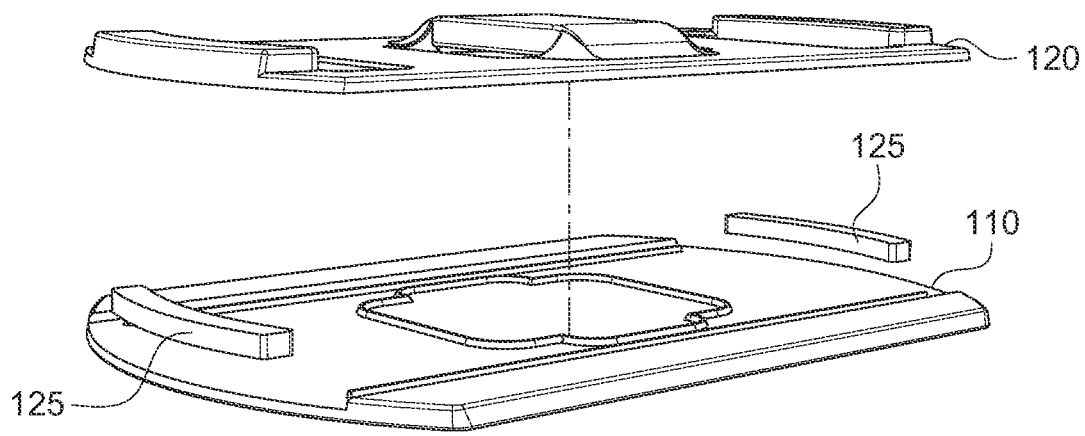
FIG. 13 illustrates an exploded view showing the cap, cap magnets and cap retainer.
Figure 14:
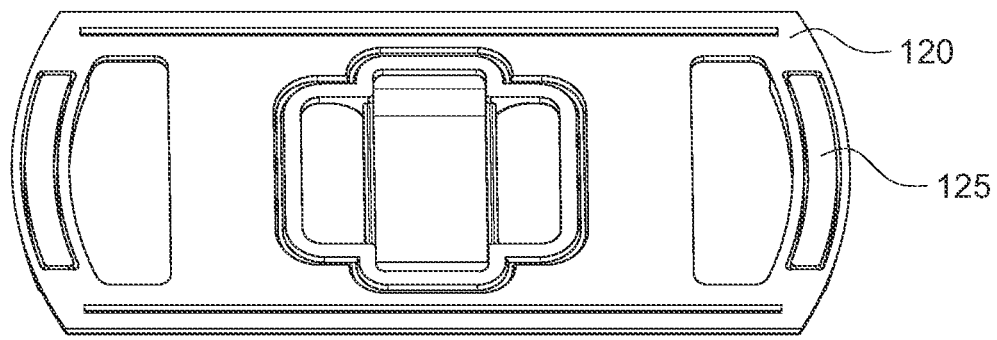
FIG. 14 illustrates the assembled cap, cap magnets and cap retainer.
Figure 15:
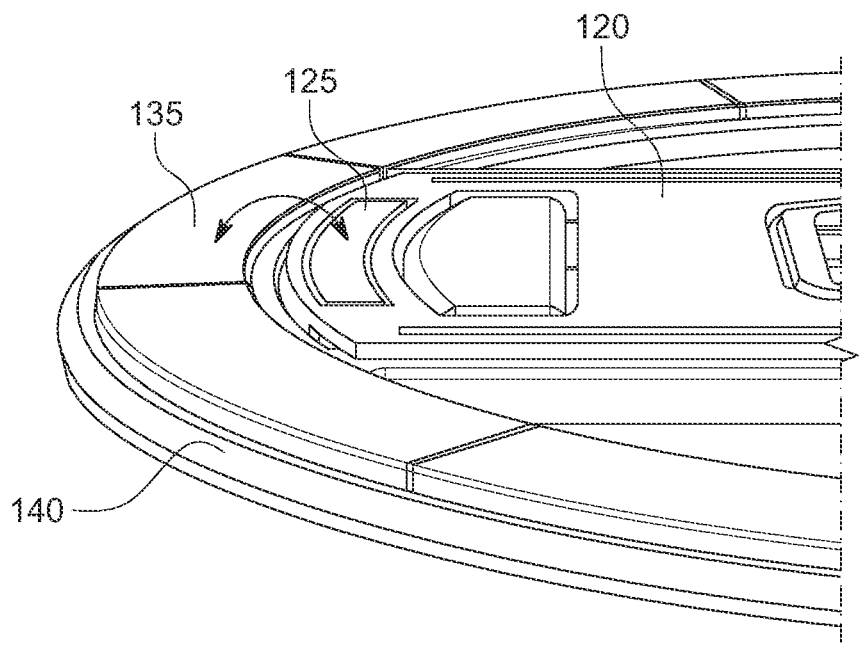
FIG. 15 illustrates the magnetic attraction and alignment of the primary magnets with the cap magnet.

To remedy this, preferred designs disclosed herein can employ two opposing small cap arc magnets 125 as shown in FIGS. 13-15. These cap arc magnets 125 are encased in cavities of the cap retainer 120 and along the opposing far edges between the cap retainer 120 and the cap 110. These cap arc magnets 125 interact with the primary arc magnets 135 as shown in FIG. 15, and automatically pull the cap 110 into alignment and hold the cap 110 in place. Because magnets do not generally wear out, this compensates for any wear to the band 115, which may wear out with extended use. These cap arc magnets 125 also functionally contribute to an overall feeling of quality. This makes it feel that the cap is held more firmly in place. And, the attraction of the cap magnets 125 to the main magnets 135 prevents unwanted noise, such as clicking between the plastic cap 110 and the trim 105 of the grip 100.

The cap 110 and band 115 also provide the stand support functionality as shown in FIG. 17A. There are two symmetrical slots 142 in the base frame 140. The outer wall of the slot 142 has a 3 degree draft angle 144 as shown in FIGS. 17A and 17B. When the user lifts up on one side of the cap 110 and rotates the cap 110 up to about 90 degrees, the pivot edge of the cap 110 will fall into the desired slot 142 of the base frame 140. Once the cap 110 slides into place within the desired symmetrical slot 142, the band 115 keeps the cap 110 within the slot 142 in tension. The user can then lean their cell phone 200 back at a comfortable viewing angle (in landscape orientation) as shown in FIG. 6 on the left. If the user wants a steeper viewing angle, the user can rotate the grip 90 degrees to view the phone in the upright position shown in FIG. 6 on the right and FIG. 7. To disengage the stand configuration shown in FIGS. 6 and 7, the user simply flips the cap 110 back out of the slot 142 and the cap 110 will automatically disengage the slot 142. The band 110 will pull the cap 110 back down to its retracted position. The cap arc magnets 125 will be attracted to, and align with, the frame magnets 135 such that the cap 110 is flush and secure with the trim 105.

Showing the cap 120 in the "stand" position of FIG. 17A, the cap sits at an 87 degree angle due to the 3 degree draft on the supporting wall 142. This is important because it prevents the cap 120 from cantilevering itself out, but not so aggressively that the cap 120 can be forcibly slammed shut without breaking the cap 120, frame 140 or other components. The band (not shown) holds the cap 120 in tension in this position.

As discussed herein, the important functionality improvements of the grip 100 over conventional cell phone 200 grips include the grip 100 is extremely comfortable. The grip 100 easy to engage and easy to disengage, and automatically returns to its disengaged, aligned, and low-profile position. The grip 100 is easy to rotate while using the finger strap enabled by the cap 110 and band 115, the band 115 having ends secured to the frame retainer 130 and a middle section secured to the cap retainer 120. Another important improvement discussed in further detail hereinafter includes user replaceability of the band 115.

Important improvements in comfortability due to varying finger sizes, holding positions, and phone 200 sizes are addressed by the grip 100 disclosed herein. Because the grip 100 uses a flexible band 115 encased between 2 rigid retainer structures 120 and 130, the user's finger(s) will get squeezed between two hard surfaces (the bottom of the clip retainer 120, and the top of the frame retainer 130 and trim 105). This will create a high pounds-per-square-inch (PSI) scenario particularly on the top of the engaged finger. If there is too much pressure on the finger(s), circulation to the finger(s) can be cut off or cause general discomfort when using the clip 100 for a long period of time. PSI can simply be decreased by increasing the elasticity of the band 115 according to certain embodiments because the more flexible the band 115, the less secure the grip 100 will feel. This is especially the case to a user with smaller than average finger size. Therefore, certain designs disclosed herein can reduce PSI by increasing the surface area of contact. This is done by reducing the width of the hard surface of the clip retainer 120 so the band 115 itself can wrap around and contact the finger of the user when the band 115 is stretched out.

Referring to FIGS. 4 and 17B, preferably the user's finger can slide underneath the cap 110 as shown all the way without using a second hand. This is another reason why the cap 110 is rigid (and not just a flexible band), as this rigidity makes sliding a user's finger under the cap 110 easier. As shown in FIG. 17B, preferably there is an air gap 111 between the bottom of the cap 110 and the frame 140 as indicated by the arrow in FIG. 17B.

Figure 10:
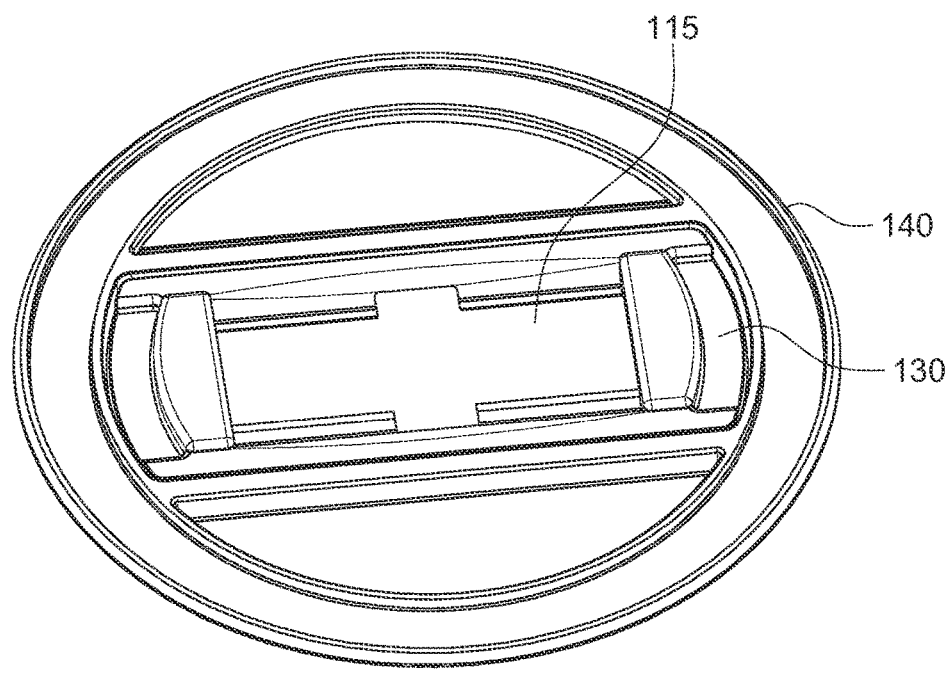
FIGS. 10 and 11 illustrate the enlarged end portions of a band being encapsulated and secured to a frame component and frame retainer component.

Referring to FIGS. 10 and 11, the band 115 is anchored to the frame assembly including the frame 140 and frame retainer 130, the frame retainer 130 including encapsulating voids for retaining enlarged end portions of the strap 115 as shown in FIG. 11. The silicone band 115 can be compression molded with 2 thick areas at either end and one thick area in the middle as shown. These thick areas are compressed and trapped between the retainers 130 and 120 (see FIG. 12) that trap the band in these widened and/or enlarged end and middle portions. However, the strap 115 advantageously is anchored in such a way that when the user wants to rotate the grip 100 while the finger is engaged between the cap and frame 140, the silicone band 115 doesn't itself twist around. Moreover, the rotational force is applied to the outer radials of the grip 100 as much as possible, so the entire grip 100 rotates as desired. By rotationally locking the band 115 to the cap 110 as shown in FIG. 12 via the rib/capture mechanism of the cap retainer 120 as shown and by having a lot of surface area at the anchor points of the band 115 on either end of the cap retainer 120, this is optimized.

Figure 18:
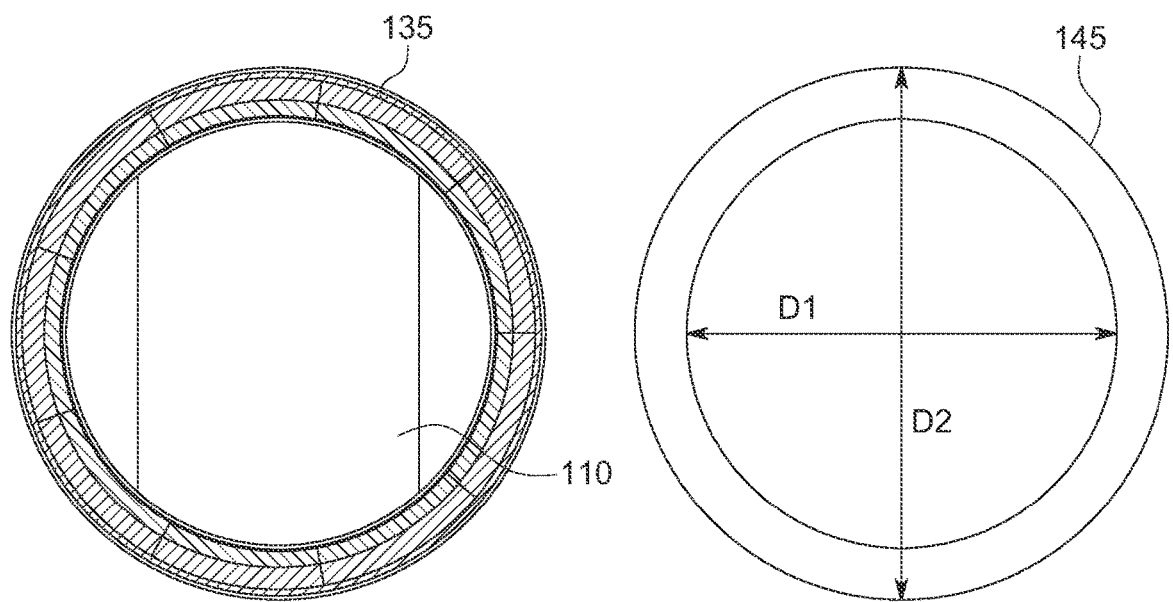
FIG. 18 illustrates the diameters of the metallic ring and polarization attributes of the primary magnets.
Figure 20:
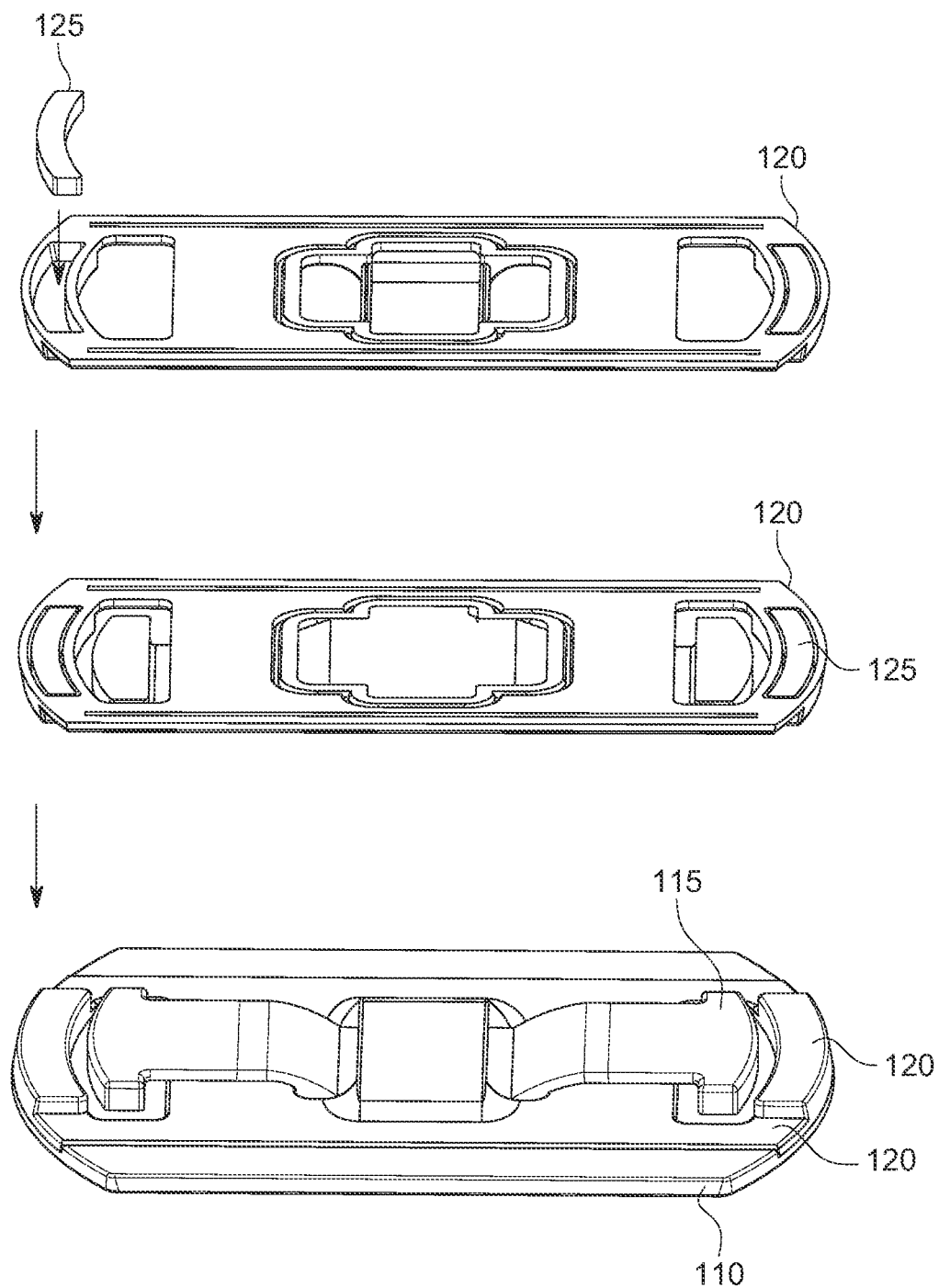
FIGS. 20-23 illustrate methods of assembly and manufacture of the finger grip.
Figure 21:
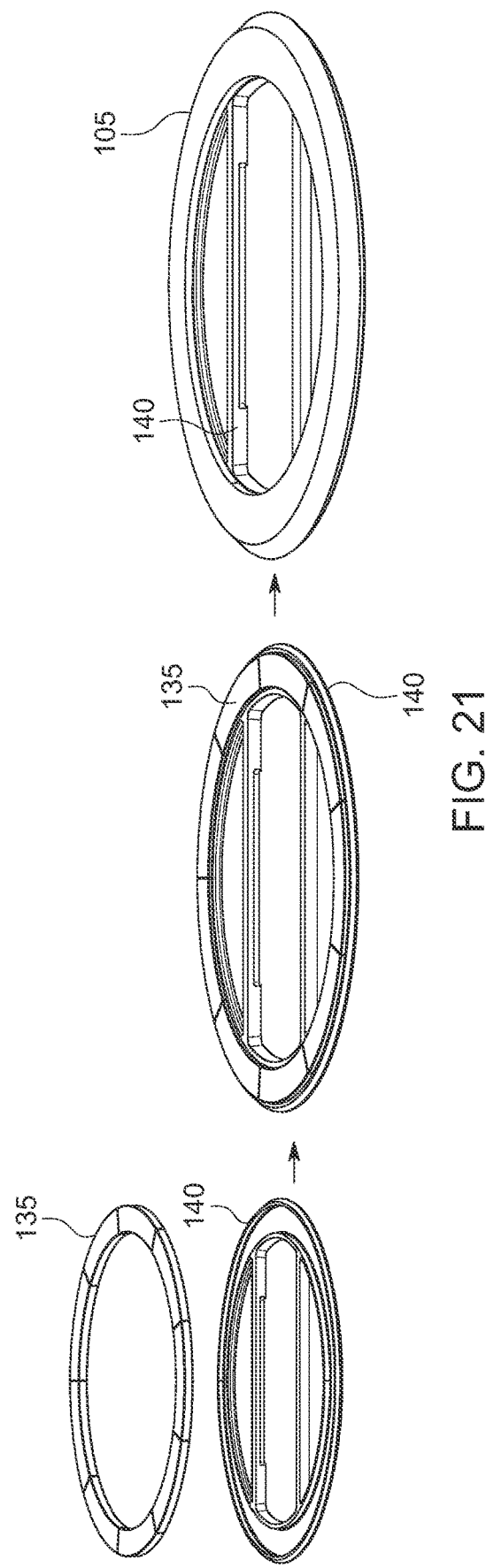
Figure 22:
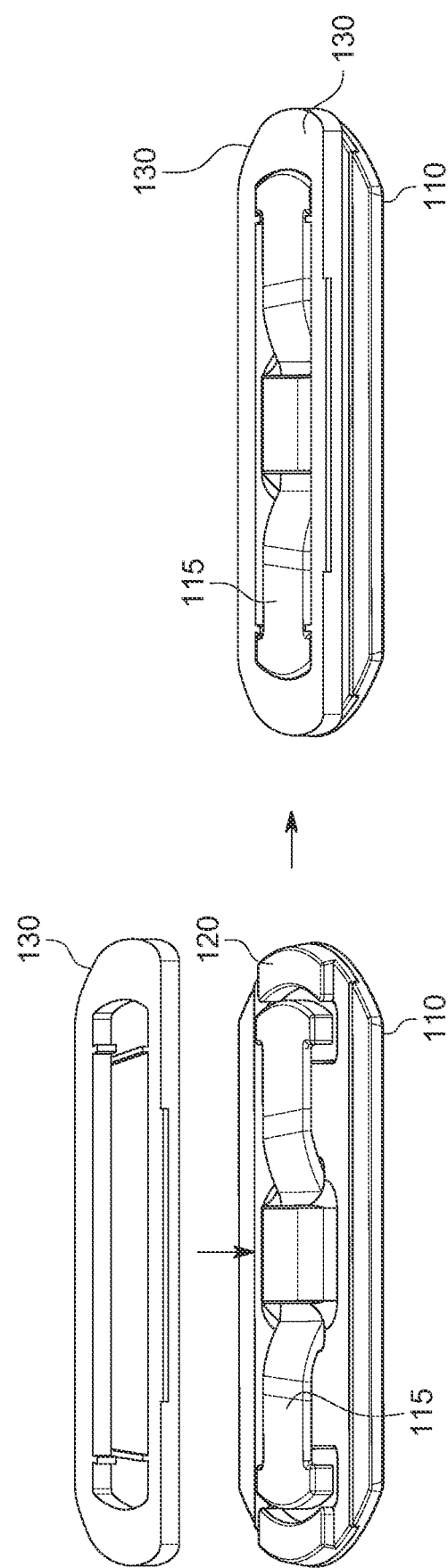

Referring to FIG. 18, the magnets 135 and metal ring 150 are shown. As illustrated by the hatching of the magnets 135, magnet 135 has two polarities on each large flat side. The outer ring is positive (+) polarity, and the inner ring is negative (−) polarity. This design has been discovered by the inventor to both enhance magnetic strength and focus the fields which reduces magnetic interference, which is very advantageous for wireless charging. As shown in FIG. 19, the frame 140 includes a circular recession in the bottom that seats upon and mates with the circular metal ring 145 thereby locking the frame 140, and as a result the grip 100 in place in the X and Y directions as previously discussed. Referring to FIGS. 20-23 a method of manufacturing and assembling a grip is illustrated. Also illustrated is the replaceability of the cap, band, and retainers subassembly. Referring to FIG. 20, the aligning arc cap magnets 125 are place inside the cap retainer 120. Next, the band 115 is placed into the cap retainer 120. Next, the cap 110 and cap retainer 120 are ultrasonically welded together, thereby securing placement of the cap magnets 125 and band 115. Referring to FIG. 21, primary magnets 135 are paced/installed into the frame 140. Next, the plastic trim 105 is ultrasonic welded onto the plastic frame 140. For aluminum trim 105, the trim 105 is snapped over the top of the frame 140, glue can be added for additional strength. Next, referring to FIG. 22, the frame retainer 130 is assembled with the cap 110, cap retainer 120 and band 115. Finally, referring to FIG. 23, the cap 110, band 115, and retainers 120 and 130 assembly is secured on one edge and pressed down snapping same into place and connecting the assembly with the frame 140. As previously mentioned the cap 110, band 115, and retainers 120 and 130 assembly can be removed and replaced such that the frame 140, primary magnets 135, and trim may continue to be used where the band wears or other part of the assembly breaks, for example.

It is understood that when an element is referred hereinabove as being "on" another element, it can be directly on the other element or intervening elements may be present there between. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Herein is presented a newborn anti-scratch and chew mitt. The disclosure is illustrated by example in the drawing figures, and throughout the written description. It should be understood that numerous variations are possible, while adhering to the inventive concept. Such variations are contemplated as being a part of the present disclosure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A finger grip, comprising:
    a circular metallic ring;
    a finger grip assembly for holding the grip using one or more fingers, the finger grip assembly including:
        a frame supporting one or more magnets for magnetically coupling the finger grip assembly to the circular metallic ring;
        a cap; and
        two flexible bands coupling the cap to the frame and allowing for insertion of a finger between the cap, the two flexible bands, and frame.

2. The finger grip according to claim 1, wherein the one or more magnets include a circular array of magnets arranged around a periphery of the frame.

3. The finger grip according to claim 2, wherein the outer periphery of the frame substantially conforms to an outer diameter of the circular metallic ring.

4. The finger grip according to claim 1, wherein the one or more magnets include a plurality of arc-shaped magnets disposed in a circular peripheral channel of the frame.

5. The finger grip according to claim 4, further comprising a trim element having a circular peripheral cavity for retaining the arc-shaped magnets when connected to the frame.

6. The finger grip according to claim 1, further comprising a circular double-sided adhesive substrate adhered to a side of the circular metallic ring and conforming to a shape of the circular metallic ring.

7. The finger grip according to claim 1, further comprising a frame retainer configured to retain opposing ends of the band against the frame.

8. The finger grip according to claim 7, further comprising a cap retainer, the cap retainer configured to retain a middle portion of the band against the cap.

9. The finger grip according to claim 8, the cap retainer being connected to the cap.

10. The finger grip according to claim 9, the cap retainer being welded to the cap.

11. The finger grip according to claim 9, the frame retainer having a mechanical connector for mechanically connecting the frame retainer to the frame.

12. The finger grip according to claim 11, the frame retainer being disconnectable from the frame to replace the frame retainer, band, cap retainer, and cap.

13. The finger grip according to claim 1, further comprising cap magnets coupled to the cap and aligning the cap with the one or more magnets supported by the frame.

14. The finger grip according to claim 1, wherein the finger grip assembly is configured to spin indefinitely relative to the circular magnetic ring when magnetically the finger grip assembly is coupled to the circular magnetic ring.

15. The finger grip according to claim 1, the frame comprising a slot for receiving and supporting a side of the cap to provide a support structure for viewing a cell phone at an angle to a surface.

16. The finger grip according to claim 15, wherein the finger grip assembly is rotatable about the circular metallic ring such that the cap is configured to provide a support structure for the cell phone in different orientations and different angles.

17. The finger grip according to claim 15, the frame comprising two symmetrical slots for receiving opposing sides of the cap to provide the support structure, the band biasing the cap when the cap is inserted into one of the two symmetrical slots.

18. The finger grip according to claim 1, an amount of external magnetic force from the finger grip to couple the finger grip assembly to the circular metallic ring being greater than an amount of external magnetic force from the finger grip to couple the finger grip to another external metallic object.

19. The finger grip according to claim 1, the one or more magnets providing between 3 and 3.9 pounds of force to couple the finger grip to an external metallic object.

20. The finger grip according to claim 19, the one or more magnets providing about 4 pounds of force to couple the finger grip assembly to the circular metallic ring.

21. The finger grip according to claim 1, wherein the one or more magnets are an array of multi-polarity arch magnets, wherein an outer ring of the magnets has positive polarity and an inner ring of the magnets has negative polarity.

22. The finger grip according to claim 21, wherein the multi polarity arrangement of magnets enhances magnetic strengths and focuses the magnetic fields which reduces magnetic interference for improved wireless charging.

23. The finger grip according to claim 1, wherein the metallic ring is a steel ring having an outer diameter of about 57 millimeters, an inner diameter of about 45.8 millimeters and a thickness of about 0.4 millimeters.

24. The finger grip according to claim 1, wherein the frame includes grooves on a bottom surface contacting the metallic ring to reduce rotational friction between the frame and the metallic ring.

* * * * *